May 25, 1965  R. S. BORGHESANI  3,185,060
PHOTOGRAPHIC APPARATUS
Filed Aug. 3, 1962  3 Sheets-Sheet 3
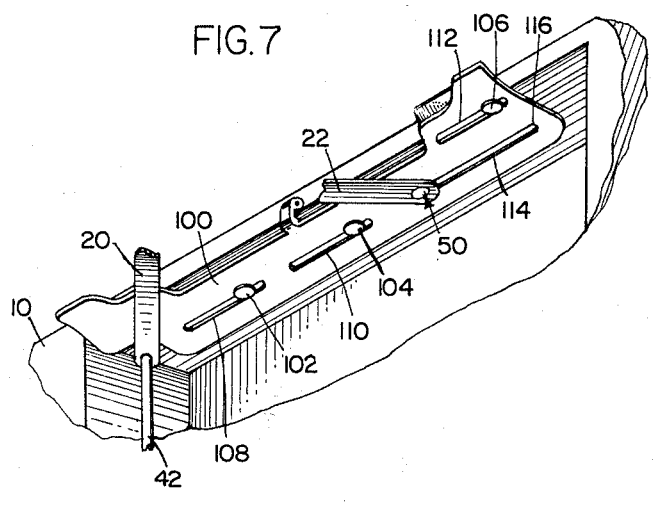
FIG. 7
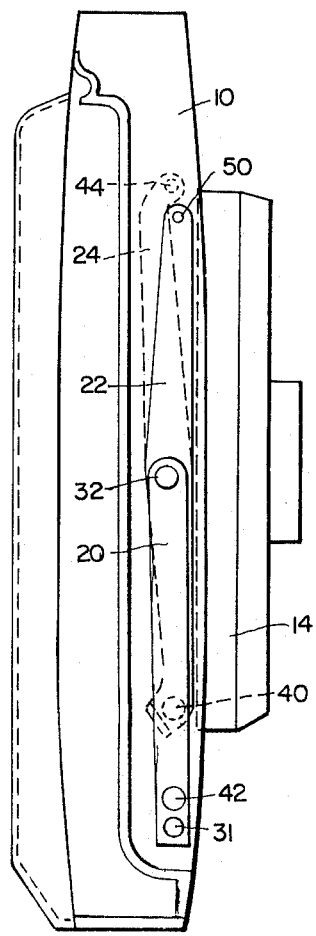
FIG. 5
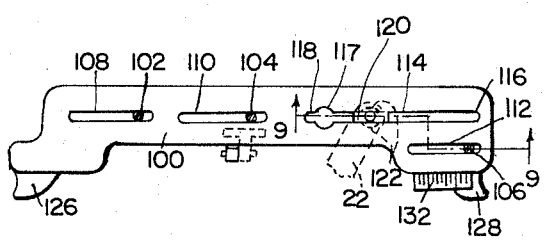
FIG. 8
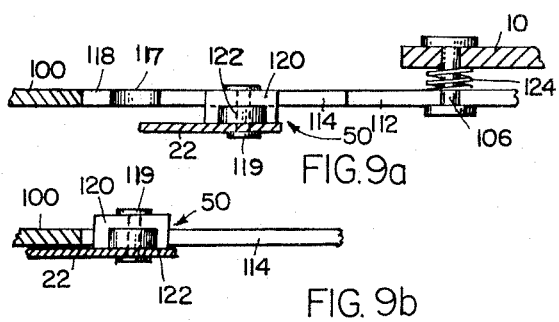
FIG. 9a
FIG. 9b
INVENTOR
Robert S. Borghesani
BY
Brown and Mikulka
ATTORNEYS

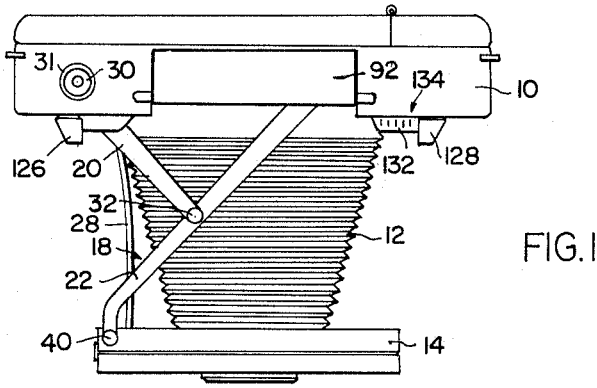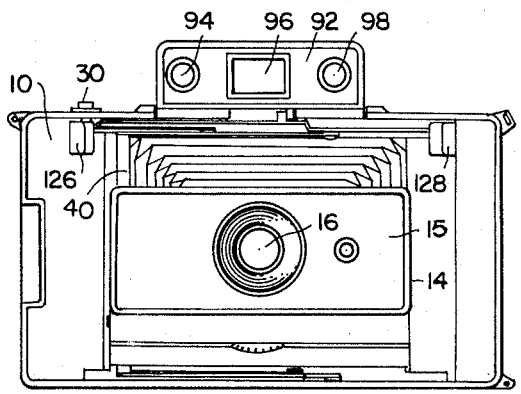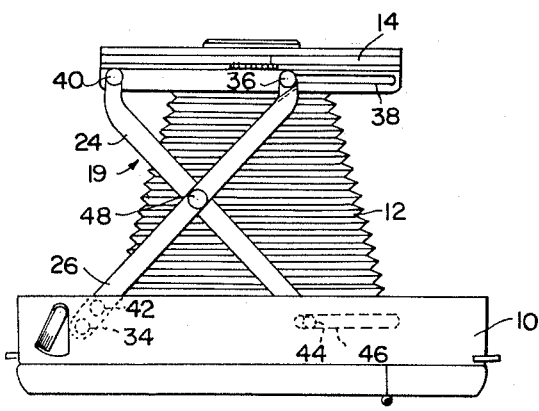

3,185,060
PHOTOGRAPHIC APPARATUS
Robert S. Borghesani, Arlington, Mass., assignor to Polaroid Corporation, Cambridge, Mass., a corporation of Delaware
Filed Aug. 3, 1962, Ser. No. 214,560
11 Claims. (Cl. 95—45)

This invention relates to photographic apparatus, and more specifically to apparatus for supporting and maintaining an objective lens in proper registration with the film plane of a camera and for imparting focusing movement to the lens.

For camera lens systems having a focal length which is comparatively long relative to the lens aperture, in the interest of providing a compact device, it has been found convenient to provide apparatus for allowing movement of the lens system between a position closely adjacent the film plane within the camera body and a position wherein the film plane and the focal plane of the lens system are substantially coextensive. To provide a covered or protected optical path between the lens system and the film, such cameras usually include means such as an expansible and collapsible bellows. The prior art includes a large number of mechanical systems for supporting the camera objective lens, or the lens board upon which it is mounted, and for maintaining it in proper registration with the camera film plane when in the extended position. Such apparatus is commonly referred to as the camera or lens "erecting system" and often includes a camera bed upon which the lens board is supported. A mechanical linkage system comprising one or more rigid braces or links extending between the lens board and either the camera bed or the camera body is normally provided to hold the lens in proper relationship to the film plane.

One of the many types of erecting systems previously known in the art is that generally known as "lazy tongs" wherein the linkage extends between the camera body and the lens board. In the usual lazy tong system, as in most camera erecting systems, a first linkage system supports the lens board on one side thereof while a second linkage system, substantially identical and parallel to the first system, supports it on the opposite side. Each of the lazy tong linkage systems are characterized by one or more pairs of links pivotally connected to one another and movable between a folded position when the lens is retracted and an unfolded position when the lens is extended. Usually the ends of two links are connected to the camera body and two to the lens board. In each case, one of the ends is pivotally mounted and one slidably mounted to achieve the desired compactness in folding. Lazy tong systems in general do not possess sufficient rigidity to serve as the sole means for supporting and maintaining the lens in proper registration with the film plane when in the extended position. Consequently, it is necessary to provide either additional means, such as a camera bed, for supporting the lens board, or some means for making the lazy tong system itself more rigid. One aspect of the present invention is concerned with a camera erecting system having the simplicity and economy of manufacture of a lazy tong system while being sufficiently rigid as to be capable of independently supporting the lens board and maintaining it in proper registration with the camera film plane when in the extended position. Also, the erecting system of the present invention, through the particular construction and arrangement of parts, does not sacrifice compactness of the camera when the lens board is retracted.

Although some cameras are provided with lens systems wherein focusing is accomplished by moving one element of the system relative to the other elements, commonly known as "front element" focusing, the majority of cameras are of the "unit focus" type, wherein focusing is effected by movement of the entire lens system relative to the film plane. In unit focus cameras it is often convenient to mount the lens system fixedly upon a lens board, or other convenient support, and focus by moving the lens board as a whole. The prior art is replete with examples of mechanisms for imparting focusing movement to an objective lens or lens system through movement of the lens board. Such mechanisms are normally distinct from the camera erecting system, although they are often mounted upon portions of the erecting system, such as the camera bed. According to another aspect of the present invention the camera erecting system may be used to impart focusing movement directly to the lens board. Since the linkage which comprises the erection system is movable with the lens board as it is moved between retracted and extended positions, movement imparted to the linkage may also be translated to focusing movement of the lens. During movement of the lens board between retracted and extended positions, as well as during focusing movement, the optical axis of the lens system remains substantially stationary. Focusing movement of the lens relative to the film plane between infinity and a minimum desired focus distance may be accomplished by linear movement of one of the slidably mounted ends of the linkage system in a direction transverse to the optical axis, or direction of focusing movement, of the lens. This linear movement may also be translated to movement of means for projecting a measuring beam in a range finder system for use in conjunction with the camera lens.

In general, the present invention comprises a linkage system connected at opposite ends to the camera body and the lens board, whereby the linkage is movable in response to relative movement of the lens board and camera body, and vice versa. The linkage system is adapted to perform the function of supporting the lens board and maintaining the lens in proper registration with the film plane of the camera, or of imparting focusing movement to the lens, or both functions concurrently. The general construction of the linkage system is that of lazy tongs except that the present invention, in a preferred embodiment, is constructed asymmetrically; that is, the pairs of links comprising the system are pivotally connected to one another at a point other than the midpoint between their end connections. Hence, when the linkage is in the folded position, that is, with one link of each pair substantially superimposed on the other, the ends of the links are not directly aligned as they would be if the links were of the same length and connected at their mid-points. This allows a rigid cross member to extend between the opposite linkage systems while remaining out of the path of movement of the lens board when it is moved between the retracted and extended positions. The lens board may therefore be withdrawn further in the retracted position than if the cross member were positioned across its path of movement. A rigid structure is thus achieved without sacrifice of compactness.

In addition to the erecting function described above, the linkage may be used as a means for imparting focusing movement to the lens. In fact, such a linkage may be so used even though the lens board is not movable to a retracted position, although in practice it would normally be used to best advantage in a folding camera. At least one link extends in a more or less diagonal manner between the camera body and lens board when in the unfolded position. With one end of the link pivotally mounted and one slidably mounted, movement of the slidably mounted end transversely to the direction of focusing movement results in movement of the pivotally mounted end in the direction of focusing movement due to the manner of connection of the other elements of the linkage system. Relative movement between the lens and the film plane along the optical axis of the lens is thus achieved. The rigid connection between the two linkage systems on either side of the lens board assures their cooperative movement, thus maintaining the lens in proper registration with the film plane as it is focused.

Accordingly, it is a principal object of the present invention to provide a novel erection system for a folding camera which is simple and economical in manufacture as well as rigid and durable in use.

It is a further object to provide a linkage system for supporting and maintaining a lens board in proper registration with the film plane of a camera, the linkage including cross members extending transversely of the direction of movement of the lens board but being out of the path of movement thereof.

Another object is to provide a linkage system extending between the camera body and lens board wherein continuous focusing movement of the lens is effected by movement of an end portion of one of the links in a direction transverse to the direction of focusing movement.

A still further object is to provide an erection system for a folding camera wherein the lens board is supported and maintained in registration with the film plane of the camera by a linkage system extending between the camera body and lens board, and including means for continuously moving a portion of the linkage throughout a predetermined range corresponding to the focusing range of the lens, which is moved along its optical axis in response to movement of said portion of the linkage.

Still another object is to provide an erection system of the lazy tong type for a folding camera wherein the pairs of links are pivotally connected to one another at a point other than the mid-point between their end connections, thus permitting a more compact and rigid camera structure.

Another object is to provide a folding camera wherein the lens board is supported by a pair of linkage systems having both pivotally and slidably mounted ends and including one or more rigid members extending between the linkage systems and fixedly attached to each and means for effecting continuous movement of the camera objective lens throughout a predetermined focusing range by movement of a slidably mounted end of one of the linkage systems.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIGURE 1 is a top plan view of a folding camera, shown in the open or extended position, incorporating an embodiment of the present invention;

FIGS. 2, 3 and 4 are front, bottom and side views, respectively of the camera of FIGURE 1;

FIG. 5 is a top view of the camera of FIGURE 1 shown in the folded or retracted position, with portions broken away to show more clearly the folded position of the linkages;

FIG. 7 is a somewhat diagrammatic, lower perspective view of another embodiment of some of the elements seen in FIG. 6;

FIG. 8 is a plan view of one of the elements of the apparatus of FIG. 7; and

FIGS. 9a and 9b are enlarged, fragmentary, sectional views taken on the line 9—9 of FIG. 8.

Figure 4:
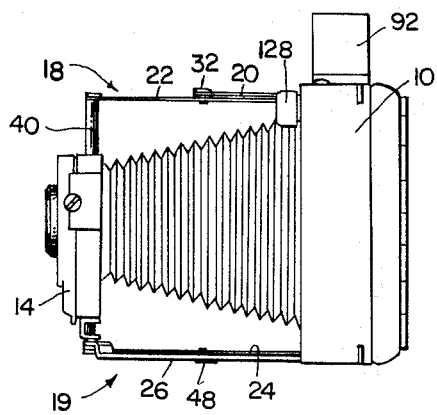

Referring now to the drawings, in FIGS. 1–5 is seen a hand-held, folding camera having the usual camera body 10, expansible and collapsible bellows 12, and lens and shutter housing 14. The camera objective lens 16 is mounted upon lens board 15, which forms the front wall of housing 14 in a conventional manner. The terms "lens" and "lens board" are used throughout the specification and claims in a broad sense; that is, lens 16 may comprise a single optical element or a lens system of the unit focus type having a plurality of elements, and lens board 15 may comprise any means previously known in the art upon which a camera objective lens is mounted and which is movable to focus the lens. Housing 14 may be moved between a folded or retracted position, shown in FIG. 5, and an extended position shown in FIGS. 1–4. Housing 14 is supported relative to camera body 10 by means of a first linkage system, denoted generally by the numeral 18, and a second linkage system 19. First linkage system 18 comprises upper links 20 and 22 and second linkage system 19 comprises lower links 24 and 26. First linkage system 18 extends from camera body 10 on one side of housing 14 and second linkage system 19 extends in a similar manner, substantially parallel to first linkage system 18, on the opposite side of housing 14. Linkage systems 18 and 19 are designed to work in cooperation with one another to support housing 14, and thus lens board 15, during movement thereof between the retracted and extended positions, and to maintain lens 16 in proper registration with the film plane (not shown) of camera body 10.

Figure 6:
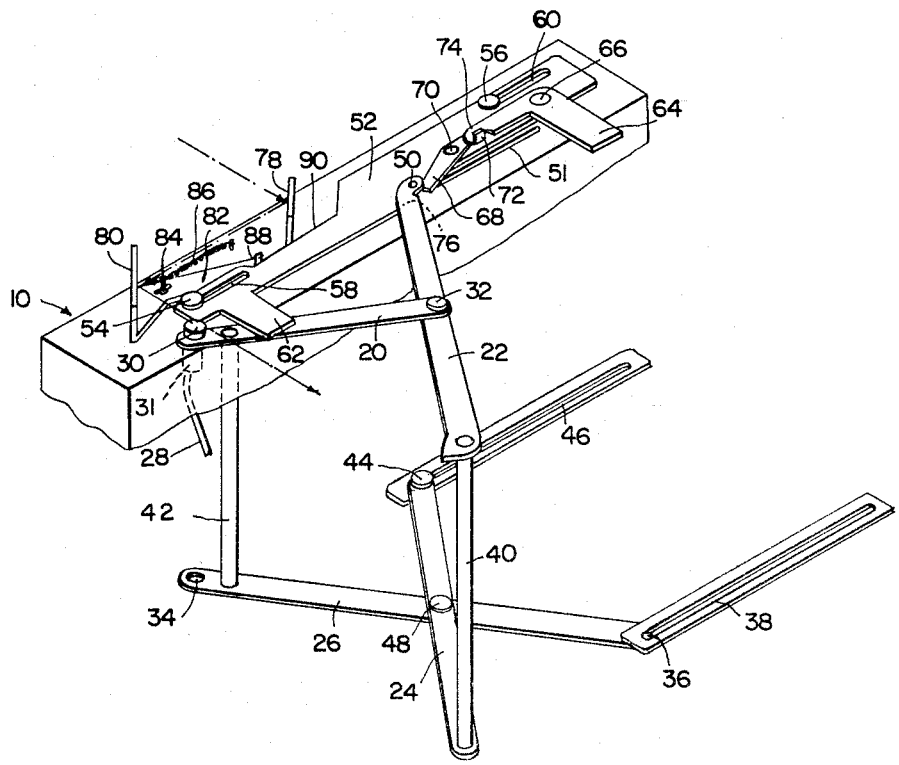
FIG. 6 is a somewhat diagrammatic, upper perspective view of one embodiment of certain elements of the apparatus of the present invention, showing also a fragment of the camera of FIGS. 1–4.

The shutter enclosed by housing 14 may be actuated by means of cable release 28, a portion of which is seen in FIG. 6, which is connected to manually depressible shutter release button 30. Stationary casing 31 is mounted in a portion of camera body 10 and supports cable release 28 and button 30 thereon. Casing 31 also serves as a pivotal mounting for one end of link 20, the other end of which is pivotally connected by pin 32 to an intermediate portion of link 22. Link 22 is slidably mounted at one end by means of pin 50 which engages slot 51 in camera body 10.

Second linkage system 19 is mounted in a similar manner on camera body 10, one end of link 26 being pivotally mounted on pin 34 and one end of link 24 being slidably mounted on pin 44 which engages slot 46 in camera body 10. Links 24 and 26 are pivotally connected to one another at intermediate points on each by means of pin 48. Link 26 is slidably mounted at one end by means of pin 36 which engages slot 38 in housing 14, or a member fixedly connected thereto.

Two rigid, elongated members 40 and 42 extend between linkage systems 18 and 19 and are fixedly attached at both ends to the facing surfaces of links in each system. Elongated member 40 passes through housing 14 and is free to rotate with respect thereto. Thus, housing 14 is supported upon elongated member 40, which in turn is supported between the ends of links 22 and 24, and one end of link 26. As housing 14 is moved with respect to camera body 10 the optical axis of lens 16 remains stationary since the pivotal and slidable mountings of the linkage systems prevent lateral motion.

From an examination of FIG. 5 it may be seen that the respective pairs of links of systems 18 and 19 are connected in an asymmetrical manner. Pins 32 and 48 which connect the links of each pair are not at the mid-point between the end connections of the links, but rather are closer to the ends of the links upon which housing 14 is supported. Consequently, the ends of the links of each system which are mounted upon camera body 10 are farther apart when the linkage is unfolded, as in FIG. 6, than the opposite ends of the same links. This allows housing 14 to be moved past elongated member 42 which would not be possible with a symmetrical linkage system wherein the links of each pair are equal in length and pivotally connected at the mid-point between their end connections. For example, if the present system were symmetrical the end connection of link 22 at elongated member 40 would be superimposed on the end connection of link 20 at casing 31 when the linkage was folded. However, as shown in FIG. 5, the aforementioned end connections are displaced from one another in the present system, and elongated member 40, although it extends transversely of housing 14, does not interfere with movement thereof between the retracted and extended positions. The result is a more compact camera structure since housing 14 may be retracted further than if its movement were interrupted by elongated member 42. An asymmetrical construction of the linkage systems therefore permits compactness of design with maximum rigidity and accuracy of operation.

It may also be seen that link 20 terminates at its connection with link 22 rather than extending to support housing 14 as do the other links. The operation of the linkage systems in moving between folded and unfolded positions is the same, of course, whether or not one or more links are foreshortened such as link 20. The rigidity imparted to the system by elongated members 40 and 42 is sufficient to maintain the lens board in registration with the film plane of the camera even though supported by only three links and it is desirable that link 20 be shortened for reasons which will be explained hereinafter.

With most lazy tong erection systems the lens is moved for focusing either manually or by some means apart from the erection system. In the case of manual movement some locking means is normally provided so that the erection system will be locked in place to hold the lens at one predetermined focus position. Locking means may be provided which will lock the erecting system in several positions of lens focus, but in any case the system is not continuously focusable through the linkage system. The rigidity imparted by elongated members 40 and 42 to the present erection system makes practical a focusing system which allows continuous movement of the objective lens between infinity and a minimum desired focus distance through movement of the linkage. According to the present invention one of the slidably mounted ends of the linkage is moved linearly and the motion is transmitted through the linkage systems to the lens board. It is important, of course, that linkage systems 18 and 19 move in exact cooperation during such focusing movement to insure optimum accuracy and reliability. This condition is provided by the torsional rigidity of elongated members 40 and 42, and by the fact that the ends of each member are fixedly attached to the facing surfaces of the two linkage systems. As one linkage system is moved towards either the folded or unfolded position, members 40 and 42 are caused to rotate about their respective longitudinal axes, thus transmitting the motion to the opposite linkage system. In order to achieve maximum torsional rigidity with a minimum of material, a circular cross sectional configuration is most advantageous. Therefore, elongated members 40 and 42 are preferably cylindrical and may be in the form of closed, hollow tubes.

In FIGS. 6 and 7 are illustrated two embodiments of means for moving a portion of the linkage system to impart focusing movement to the lens. In the embodiment of FIG. 6, as previously explained, pin 50 etxends from the end of link 22 slidably to engage slot 51 in camera body 10. As housing 14 is manually moved from the retracted to the extended position, pins 36, 44 and 50 slide along their respective slots until housing 14 reaches the extended position.

A movable member 52 is slidably mounted upon camera body 10 by appropriate means such as pins 54 and 56 extending from camera body 10 through slots 58 and 60 respectively in movable member 52. A projection 62 is provided adjacent one end of movable member 52 and a similar projection 64 is pivotally mounted adjacent the opposite end of movable member 52 upon pin 66. A rotatable member 68 is mounted upon movable member 52 by means of pin 70 and is biased by any convenient means (not shown) to rotate in a counterclockwise direction as seen in FIG. 6. An upstanding ear 72 on rotatable member 68 contacts an extending portion 74 of rotatable projection 64. As pin 50 slides down slot 51 when housing 14 is being moved to the extended position, rotatable member 68 is contacted and rotated in a clockwise direction against the force of the biasing means. As pin 50 slides past rotatable member 68 the biasing means forces rotatable member 68 to again rotate in a counterclockwise direction, whereby pin 50 is retained between the end of rotatable member 68 and step 76 on movable member 52, as seen in FIG. 6. Movement of movable member 52 will thus move pin 50 which in turn will move link 22. Movement of link 22 will be transmitted to both first linkage system 18 and second linkage system 19 as previously described. Since housing 14 is in the extended position when pin 50 is locked with respect to movable member 52, movement of the linkage systems will result in focusing movement of lens 16 relative to the film plane of camera body 10.

In order to move housing 14 away from the extended position, projection 64 is manually rotated in a counterclockwise direction as seen in FIG. 6, which results in a clockwise rotation of rotatable member 68 through contact of extended portion 74 with ear 72. With rotatable member 68 so moved pin 50 is free to slide back up slot 51 as housing 14 is moved toward the retracted position.

As previously stated, linear movement of movable member 52 may be translated to movement of means for projecting a measuring beam in a range finder system for use in conjunction with the focusing movement of lens 16. An example of such an arrangement is shown in FIG. 6. The range finder includes a stationary half-silvered or dichroic mirror 78 for receiving a direct beam from an object or scene to be photographed. Rotatable mirror 80 is mounted upon base portion 82 which is rotatably mounted upon camera body 10 by pin or rivet 84 and is biased in a clockwise direction as seen in FIG. 6 by spring 86, thus maintaining upstanding ear 88 on base portion 82 in contact with cam surface 90 of movable member 52. Linear movement of movable member 52 is thus translated, through movement of cam surface 90, to rotational movement of rotatable mirror 80 which results in deflection of the measuring beam in accordance with focusing movement of lens 16. The range finder and view finder may be enclosed by a suitable housing 92, seen in FIGS. 1, 2 and 4, mounted upon camera body 10 in any convenient manner. Windows 94, 96 and 98 are provided in housing 92 for properly directing the beams into the finder system and to the eye of the operator. With the particular configuration of elements shown in the camera of FIGS. 1–5, link 20 would extend into the field of view of the rangefinder or viewfinder if it did not terminate at pin 32, as previously described. For this reason, as well as general simplification of construction, it is desirable that link 20 be shortened as shown.

A second embodiment of means for effecting movement of the linkage system to cause focusing movement of the camera lens is shown in FIG. 7, the numbering of those elements of the mechanism common to the embodiment of FIG. 6 being retained. In this embodiment, movable member 100 is mounted within the opening in camera body 10 from which the bellows 12 and housing 14 extend. Movable member 100 is mounted for reciprocal sliding movement, in a direction substantially transverse to the direction of focusing movement of objective lens 16, upon pins 102, 104 and 106, which are fixedly attached to camera body 10, and extend through slots 108, 110 and 112, respectively, in movable member 100.

In this embodiment pin 50, extending from the end of link 22, is slidably mounted in a slot 114 in movable member 100, rather than being slidably mounted directly on the camera body as in the previously described embodiment. When housing 14 is in the retracted position, pin 50 is at or near one end 116 of slot 114; as housing 14 is moved to the extended position pin 50 slides toward the opposite end of slot 114 which contains an enlarged circular portion 117 and an extending slot portion 118. Pin 50 includes a rivet 119 having a detent slide 120 freely rotatable thereon. Cylindrical portions 122 extend from the sides of generally rectangular detent slide 120. The outer periphery of cylindrical portions 122 is larger than the width of slot 114 and substantially conforms to the dimensions of circular portion 117. Consequently, until pin 50 has been moved to a position wherein cylindrical portions 122 are in alignment with circular portion 117, corresponding to the extended position of housing 14, only the rectangular portion of detent slide 120 will ride in slot 114 as seen in FIG. 9a. As the linkage approaches the unfolded position the leading portion of detent slide 120 engages extending slot portion 118 and cylindrical portions 122 then engage circular portion 117 of slot 114, as seen in FIG. 9b. In this position linkage system 18 is locked with respect to movable member 100. Reciprocal sliding movement of member 100 will be transmitted to link 22 through pin 50, and to the rest of the linkage systems as explained in connection with FIG. 6. Focusing movement of lens 16 is thus accomplished by movement of the same elements comprising the erector system.

Link 22 is mounted in such a way relative to the other elements of the mechanism that the end upon which pin 50 is mounted is biased upwards as seen in FIGS. 9a and 9b. Thus, cylindrical portions 122 will automatically engage circular portion 117 when coming into registration therewith. In order to unlock the linkage so that housing 14 may be returned to the retracted position it is necessary only to depress slightly the end of link 22 carrying pin 50 until cylindrical portions 122 are out of engagement with circular portion 117. The head of rivet 119 above movable member 100 is larger in diameter than the width of slot 114 so that detent slide 120 cannot be completely withdrawn from slot 114 when link 22 is depressed. Detent slide 120 may then be moved in slot 114 towards end 116 thereof. It is to be noted that detent slide 120 remains always engaged in slot 114 both when cylindrical portions 122 are engaged in circular portion 117 and when they are not. This allows the elements to go from a free sliding to a locked position while remaining aligned at all times to insure smooth engagement and disengagement. As a means for restraining movement of movable member 100 as pin 50 slides along slot 114 there may be provided, in the nature of a friction brake, coil spring 124 (FIG. 9a) which encircles pin 106 and is compressed between camera body 10 and movable member 100.

As best seen in FIGS. 1 and 2, finger buttons 126 and 128 may be provided on opposite ends of movable member 52 or 100, as the case may be. When camera body 10 is grasped in the normal position for operation, buttons 126 and 128 are conveniently positioned for engagement by the index fingers of the operator. After focusing, the finger on button 126 may easily be moved to release button 30 on the top of camera body 10 to actuate the shutter for making an exposure. Thus, the camera may be focused and an exposure made while holding the camera in both hands, in the most natural and convenient position for operation, without necessitating removal of the operator's eye from the view-finder window. There may also be provided, as an alternative or in addition to the range finder, a scale 132 bearing indicia indicating the camera-to-subject distance. Scale 132 may be mounted on movable member 100, as in FIG. 8, and moved therewith relative to a fiducial mark 134 on camera body 10.

It may thus be seen that the present invention provides a novel and advantageous system for supporting the lens board of a camera and maintaining it in registration with the film plane of the camera during movement between retracted and extended positions and/or during focusing movement of the lens. The apparatus provides a particularly rigid structure without the necessity of a camera bed for supporting the lens assembly. The asymmetry of the linkage system also permits a more compact camera design. Convenient focusing means are provided through the linkage system by linear movement of a movable member in a direction substantially transverse to the direction of focusing movement of the lens.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In a folding photographic camera having a camera body and an objective lens mounted upon a lens board, apparatus for extending and focusing said lens relative to the film plane of said camera body, said apparatus comprising, in combination:
   (a) a movable member mounted upon said camera body for sliding movement relative thereto in a direction transverse to the direction of extending and focusing movement of said lens;
   (b) at least one rigid link having one end pivotally mounted upon said lens board;
   (c) a slot in said movable member extending substantially parallel to the direction of movement thereof and having an enlarged portion at one end thereof;
   (d) a pin extending perpendicularly from the other end of said link and slidably mounted in said slot; and
   (e) an enlarged portion on said pin which substantially corresponds in size to and is inserted in said enlarged portion of said slot when said pin is moved to said one end of said slot, thereby fixing the relative positions of said movable member and said other end of said link.

2. In a photographic camera having a camera body and an objective lens mounted upon a lens board, apparatus for effecting focusing movement of said lens and for maintaining said lens in registration with the film plane of said camera body, said apparatus comprising, in combination:
   (a) a first elongated member rotatably mounted upon a portion of said camera body and extending transversely to the direction of said focusing movement;
   (b) a second elongated member rotatably mounted upon a portion of said lens board substantially parallel with said first elongated member;
   (c) a first linkage system extending between said camera body and said lens board on a first side thereof;
   (d) said first linkage system including a first rigid link, fixedly mounted adjacent one end upon a first end of said first elongated member, and a second rigid link, fixedly mounted adjacent one end upon a first end of said second elongated member and slidably mounted at the other end upon a portion of said camera body;
   (e) a second linkage system extending between said camera body and said lens board on the side thereof opposite said first side;
   (f) said second linkage system including a third rigid link, fixedly mounted adjacent one end upon a second end of said first elongated member, and a fourth rigid link, fixedly mounted adjacent one end upon a second end of said second elongated member and slidably mounted at the other end upon a portion of said camera body; and
   (g) means for moving said slidably mounted end of said second link, the movement of said second link being transmitted to said first linkage system and through said first and second elongated members to said second linkage system, said first and second linkage systems being so constructed and arranged that movement thereof causes said focusing movement.

3. The invention according to claim 2 wherein said first link is pivotally attached to said second link at a point thereon substantially spaced from the central point between the mountings of said second link upon said second elongated member and said camera body, and said third link is pivotally attached to said fourth link at a point thereon substantially spaced from the central point between the mountings of said fourth link upon said second elongated member and said camera body, said first elongated member being arranged out of the path of movement of said lens board, whereby the latter may move past said elongated member in moving between folded and extended positions with respect to said camera body.

4. In a photographic camera having a camera body and an objective lens mounted upon a lens board, apparatus for effecting focusing movement of said lens relative to, and for maintaining said lens in registration with, the film plane of said camera body, said apparatus comprising, in combination:
(a) a movable member mounted upon said camera body for sliding movement relative thereto in a direction substantially perpendicular to the direction of said focusing movement;
(b) a first elongated member rotatably mounted on said camera body mutually perpendicular to the directions of said sliding movement and said focusing movement;
(c) a second elongated member rotatably mounted upon said lens board substantially parallel to said first elongated member;
(d) a first linkage system extending between said camera body and said lens board on a first side thereof;
(e) said first linkage system including a first rigid link, fixedly mounted adjacent one end upon a first end of said first elongated member, and a second rigid link, fixedly mounted adjacent one end upon a first end of said second elongated member and pivotally mounted at the other end upon said movable member;
(f) a second linkage system including a third rigid link, fixedly mounted adjacent one end upon a second end of said first elongated member, and a fourth rigid link, fixedly mounted adjacent one end upon a second end of said second elongated member, whereby movement of said movable member is transmitted through said second link to said first linkage system, through said first and second elongated members to said second linkage system, and through said first and second linkage systems to said lens board, thereby moving said lens relative to said film plane.

5. In a hand-held camera having a camera body and an objective lens mounted upon a lens board, apparatus for effecting focusing movement of said objective lens relative to the film plane of said camera, said apparatus comprising, in combination:
(a) a movable member mounted upon said camera body for reciprocal, linear movement relative thereto in a direction substantially perpendicular to the direction of said focusing movement;
(b) at least one rigid link pivotally mounted at one end upon said lens board and at the other end upon said movable member;
(c) a pair of manually engageable portions on said movable member arranged to have manual force applied to move one in a first direction and the other in the opposite direction, of said reciprocal, linear movement; and
(d) means for maintaining said movable member in the relation to said camera body to which it is moved by said manual force.

6. The invention according to claim 5 wherein said last-named means comprises a frictional engaging arrangement between said movable member and said camera body.

7. In a photographic camera having a camera body and an objective lens mounted on a lens board for focusing movement with respect to said camera body, said camera being adapted to be held for operation with one side of said camera body in the right hand and the other side in the left hand of the operator, apparatus for effecting said focusing movement comprising, in combination:
(a) a movable member slidably mounted on said camera body for reciprocal, linear movement relative thereto in a direction substantially perpendicular to the direction of said focusing movement;
(b) at least one rigid link having one end pivotally mounted with respect to said lens board and the other end pivotally mounted with respect to said movable member;
(c) a first manually engageable portion extending fixedly from said movable member to a position adjacent said one side of said camera body, whereby manual force may be applied thereto by the hand in which said one side is held, toward said other side; and
(d) a second manually engageable portion extending fixedly from said movable member to a position adjacent said other side of said camera body, whereby manual force may be applied thereto by the hand in which said other side is held, toward said one side;
(e) said rigid link being so constructed and arranged relative to said movable member and said lens board that movement of said movable member through application of said manual force is transmitted through said link to cause said focusing movement of said objective lens.

8. In a photographic camera having a camera body and an objective lens mounted on a lens board for focusing movement with respect to said camera body, said camera being adapted to be held for operation with one side of said camera body in the right hand and the other side in the left hand of the operator, apparatus for effecting said focusing movement comprising, in combination:
(a) a movable member slidably mounted on said camera body for reciprocal, linear movement relative thereto in a direction substantially perpendicular to the direction of said focusing movement;
(b) at least one rigid link having one end pivotally mounted with respect to said lens board;
(c) an elongated slot in said movable member extending substantially parallel to the direction of movement thereof;
(d) a pin extending from the other end of said link and slidably mounted in said slot;
(e) means for releasably locking the position of said pin with respect to said slot, thereby causing said other end of said link to be pivotally arranged with respect to said movable member, whereby said linear movement of said movable member is transmitted through said link, which is constructed and arranged thereby to cause said focusing movement;
(f) a first manually engageable portion of said movable member arranged to have manual force applied thereto in one direction of said linear movement by the right hand of the operator; and
(g) a second manually engageable portion of said movable member arranged to have manual force applied thereto in the opposite direction of said linear movement by the left hand of the operator.

9. The invention according to claim 8 wherein said means for releasably locking comprise an enlarged portion of said pin which substantially corresponds in size to and is inserted in an enlarged portion of said slot when said pin is in a predetermined position of its sliding movement relative to said slot.

10. The invention according to claim 8 wherein means are provided to limit the movement of said movable member in said one direction to correspond to the infinity focus position of said objective lens, and to limit extent of said linear movement in said opposite direction to correspond to a close-up focus position of said objective lens.

11. The invention according to claim 10 and further including a frictional engaging arrangement between said movable member and said camera body for maintaining said movable member in the relation to said camera body to which it is moved by said manual force.

References Cited by the Examiner

UNITED STATES PATENTS

| 2,045,037 | 6/36 | Lingg | 95—44 |
| 2,065,335 | 12/36 | Kuppenbender | 95—44 |

FOREIGN PATENTS

| 373,481 | 4/22 | Germany. |
| 397,297 | 6/24 | Germany. |

NORTON ANSHER, *Primary Examiner.*

JOHN M. HORAN, *Examiner.*